FRANK L. CHRISTENSEN
LAWRENCE FREAR
INVENTOR.

BY
Bernard Kriegel
ATTORNEY.

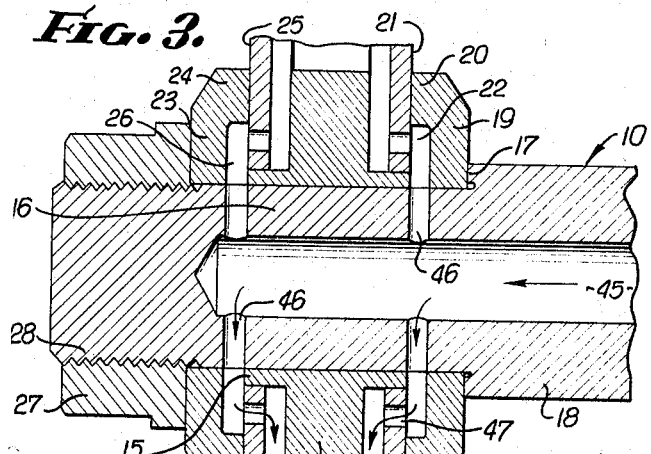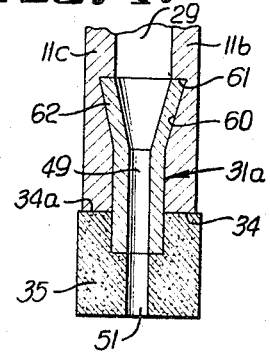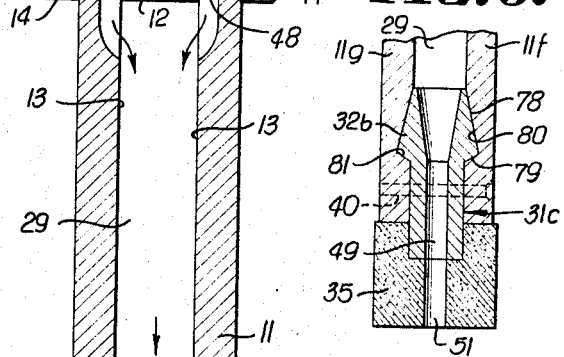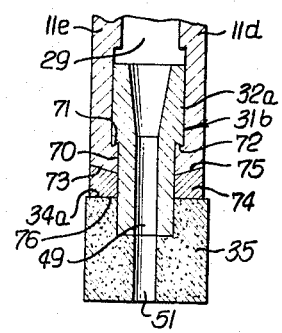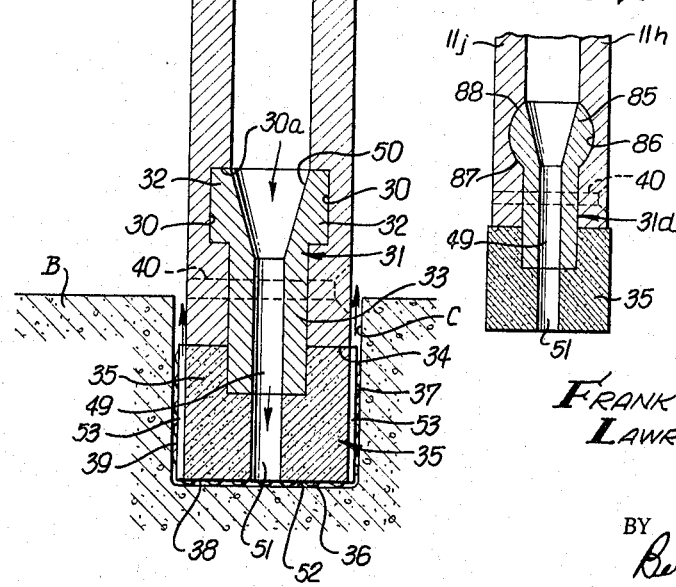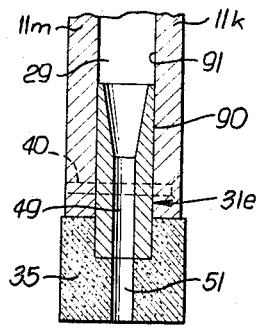
FRANK L. CHRISTENSEN
LAWRENCE FREAR
INVENTOR.
BY
Bernard Kriegel
ATTORNEY.

United States Patent Office 3,282,263
Patented Nov. 1, 1966

3,282,263
FACE DISCHARGE CUTTING BLADES
Frank L. Christensen, Salt Lake City, and Lawrence Frear, Sandy, Utah, assignors to Christensen Diamond Products Company, Salt Lake City, Utah, a corporation of Utah
Filed July 29, 1963, Ser. No. 298,222
9 Claims. (Cl. 125—15)

The present invention relates to cutting devices, and more particularly to circular saws, and the like, for operating effectively on the material to be cut.

An object of the present invention is to provide a saw blade device in which a coolant and flushing fluid can be delivered to the region of the cutting action of the device in the work for the purpose of more effectively cooling the device and the work, and also to flush cuttings from the cutting region and from the blade device itself in order to maintain the blade device in a clean condition so that its cutting action is unimpeded by adherent cuttings or by a mass of cuttings on the work itself.

Another object of the invention is to provide a saw blade device comprising an inner disc portion and an outer cutting rim portion in which a coolant can be circulated through the disc portion to remove heat therefrom and thereby prevent its temperature from increasing to an extent that might produce its distortion.

A further object of the invention is to provide a saw blade device through which a coolant and flushing fluid can be circulated in such manner that the rotating device acts as a pump in creating its own suction to draw the coolant into the device and in centrifugally discharging it outwardly of the device.

An additional object of the invention is to provide a composite saw blade device of strong and sturdy construction having a separate cutting rim portion assembled to an inner disc portion, the rim portion being readily replaceable when worn, but the composite saw blade device itself functioning in the manner of an integral structure.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Referring to the drawings:

FIG. 3 is an enlarged cross-section through a portion of the device disclosed in FIGS. 1 and 2;

FIG. 4 is a fragmentary section through a second embodiment of the invention;

FIG. 5 is a fragmentary section through a third form of the invention;

FIG. 6 is a fragmentary section of a fourth embodiment of the invention;

FIG. 7 is a fragmentary section through a fifth embodiment of the invention; and FIG. 8 is a fragmentary section through a sixth form of the invention.

Figure 1:
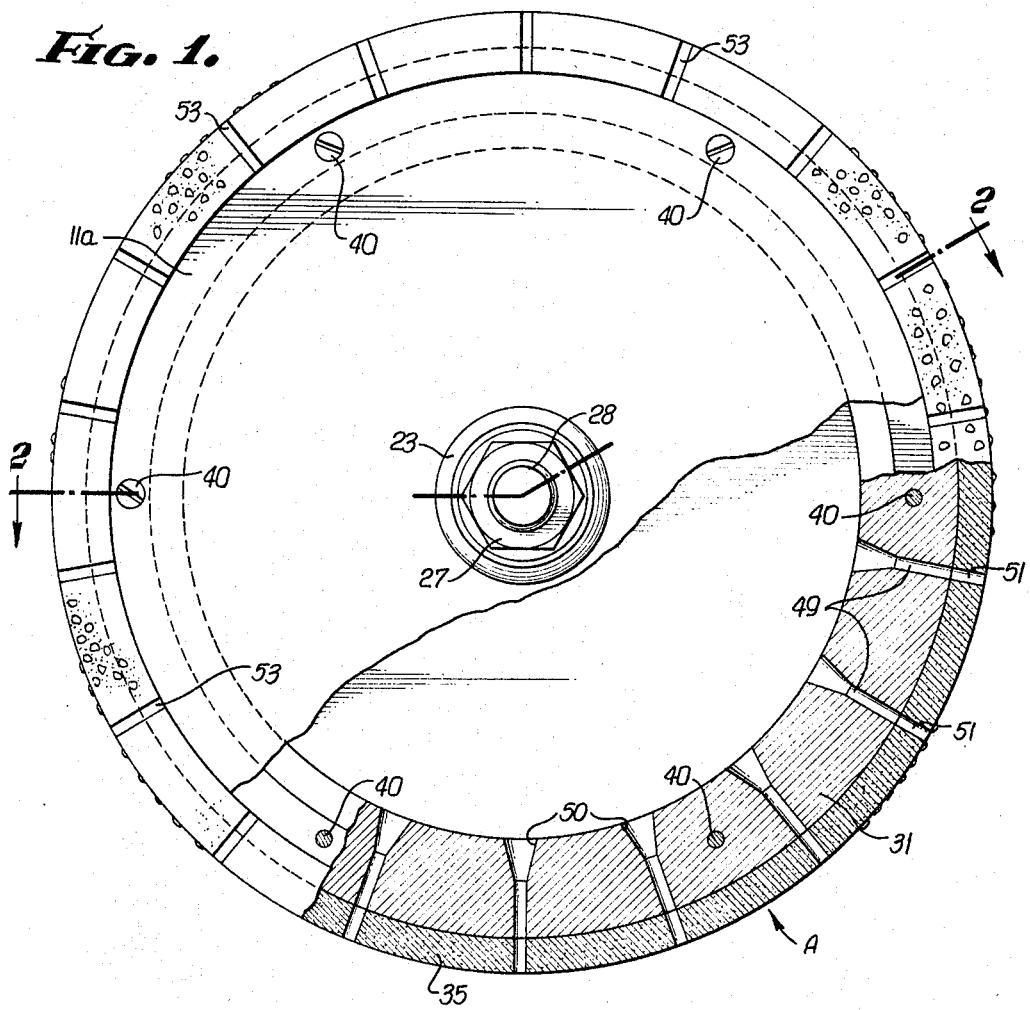
FIGURE 1 is a plan view of a saw blade device embodying the invention, portions being broken away and shown in section.
Figure 2:
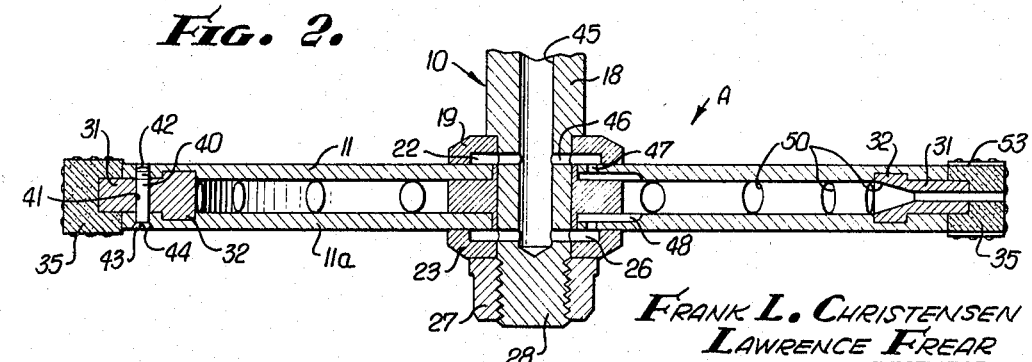
FIG. 2 is a section taken along the line 2—2 on FIG. 1.

The saw device A illustrated in FIGS. 1 to 3 of the drawings is adapted to cut a suitable material B, such as concrete, marble, granite, brick, slate, refractory, and the like. The saw device includes a composite structure that is rotated by a suitable source of power (not shown), and through which a coolant and flushing fluid can be forced, for the purpose of maintaining the device in a relatively cool state, free from cuttings, and to remove the cuttings from the working region.

As shown, a rotatable shaft or arbor 10 has a composite saw device secured thereto. Such saw device includes opposed supporting discs 11, 11a, which may be made of steel, mounted on and clamped to the shaft. The inner portions of the discs are disposed on opposite sides of a spacer 12, the inner side walls 13 of the discs abutting the sides 14 of the spacer. The discs themselves may be mounted upon axially and oppositely directed hub portions 15 of the spacer, which is mounted upon a reduced diameter portion 16 of the shaft or arbor, such reduced diameter portion providing a stop shoulder 17 at the adjacent larger diameter portion 18 of the shaft.

Mounted upon the reduced diameter portion 16 and abutting the shoulder 17 is a clamp member 19 having an axial outer flange 20 engaging the outer side 21 of one of the disc members 11 and having a counterbore 22 providing an annular fluid space with the disc member 11, hub 15 of the spacer member 12, and reduced diameter shaft portion 16. A similar opposed clamp member 23 is mounted on the reduced diameter portion of the shaft at the exterior of the other disc 11a, having an axially directed flange 24 engaging the exterior side 25 of such disc, the clamp member also having a counterbore 26 forming an annular fluid space with the shaft portion 16, disc 11a, and spacer hub 15. A lock or clamp nut 27 is threaded upon the outer threaded portion 28 of the shaft, being tightened against the clamp member 23 to force such clamp member toward the other clamp member 19 that abuts the shaft shoulder 17, in order to firmly force the clamp member 23 against the disc member 11a, such disc member against the spacer 12, the spacer against the other disc member 11, such other disc member against the other clamp member 19, and the latter against the shaft shoulder 17, thereby firmly securing all of theses parts to one another for unitary rotation with the shaft or arbor 10. It is to be noted that with such clamping action, the disc members 11, 11a are separated from one another, providing a large circumferential space 29 therebetween outwardly of the periphery of the spacer 12.

Adjacent to their peripheries, the disc members 11, 11a have opposed circumferentially continuous inner side grooves 30 in which oppositely directed axial head portions 32 of a circumferentially continuous or segmented connector ring 31 are adapted to be mounted, this ring being substantially T-shaped in cross-section. The central leg portion 33 of the ring 31 is disposed between the disc members 11, 11a themselves outwardly of the grooves 30, the leg or central portion extending radially outwardly beyond the peripheries 34 of the discs and being anchored within a matrix ring or rim 35 having diamond cutting elements 36, 37 embedded in its peripheral portion 38, as well as embedded within the opposite side portions 39 of the matrix ring. If desired, a diamond impregnated matrix ring may be employed, in which diamonds are dispersed throughout the matrix mass. The sides 39 of the diamond matrix structure 35 extend axially outwardly beyond the outer sides 21, 25 of the disc members, so as to avoid contact of the latter sides with the work B during a cutting action thereon.

The tightening of the clamp nut 27 upon the shaft 10 will secure the disc members 11, 11a to the shaft through the interengaging clamping action of the clamp members 19, 23, disc members 11, 11a, and spacer 12. They will also serve to clamp the connector ring 31 between the opposed disc members, with the outwardly directed axial or tongue portions 32 of the T-shaped ring received within the grooves 30, for the purpose of resisting axial movement of the ring 31 with respect to the discs. Such clamping action of the connector member to the discs may be supplemented by a plurality of circumferentially spaced rivets or screws 40 extending through the discs 11, 11a outwardly of the grooves 30 and through the central portion 33 of the connector ring 31. As shown, the screws 40 are inserted from one disc 11 through holes 41 in the connector ring 31, the threaded shank of the screws being threadedly received within companion threaded holes 42 in the opposed disc 11a. The screws may have countersunk heads 43 received within countersunk holes 44 in the disc member 11.

The outer cutting member 31, 35, 36, 37 of the saw device illustrated is separate from the opposed discs 11, 11a and can be assembled thereon through use of the rivets, screws, or similar fastening devices 40, and may also be disassembled therefrom. The diamond set cutting ring 35 can be molded to the connector ring 31 in a known manner and becomes united therewith with assurance that the matrix 35 will not separate from the connector ring.

Upon rotating the shaft or arbor 10 and the composite saw construction attached thereto, and pressing it into the work B, a groove C (FIG. 3) will be cut in the later having a width corresponding to the width or axial extent of the diamond set ring 35. The diamonds 36 in the end face 38 of the ring will cut the groove; whereas, the diamonds 37 in the side faces 39 of the ring will insure that the groove cut in the work is of the desired width, and will prevent, or minimize considerably, the eroding action of the work on the sides of the matrix ring.

To insure effective cutting action of the saw device A in the work B, a coolant and flushing fluid is flushed through the device and also into the work. As shown, the shaft or arbor has a central axial passage 45 therein communicating with longitudinally spaced sets of radial ports 46 in the reduced diameter portion of the shaft that open into the annular fluid spaces 22, 26 provided by the counterbores of the clamp members 19, 23. These fluid spaces, in turn, communicate with axial ports or passages 47 in the inner portions of the disc members 11, 11a that open into circumferentially spaced, generally radial grooves or passages 48 in the inner portions of the disc members, which communicate with the space 29 between the disc members outwardly of the spacer member 12. The connector ring 31 has circumferentially spaced, generally radial discharge ports 49 extending therethrough, the inner portion 50 of each port being flared or tapered for better direction of the fluid from the space 29 between the discs into the port, and the outer end of each port 49 communicating with a central generally radial discharge port 51 extending through the diamond set matrix ring 35 to its periphery.

The fluid discharging from the radial ports 51 will be directed against the bottom 52 of the groove C being cut in the work B, and will then flow axially in opposite directions across the peripheral or end face 38 of the matrix ring toward the sides 39 of the latter, to clean and maintain the diamonds 36 free from cuttings and to flush the cuttings toward the sides 39 of the matrix ring. The fluid will then flow in a generally radial inward direction toward the exterior of the groove C along the sides 39 of the matrix ring 35 and the side or gage diamond elements 37 to carry the cuttings out of the groove C and also to clean the sides of the ring and the diamonds 37 of cuttings and maintain them in a clean condition. In order to facilitate flushing of the cuttings from the cutting region in the work, the sides 39 of the matrix ring 35 may be provided with circumferentially spaced, generally radial flushing grooves or slots 53 into and through which the cuttings and fluid can flow for more ready removal outwardly of the groove C.

During the rotation of the apparatus and its cutting of the groove C in the work B, a suitable coolant and flushing fluid is constantly being forced through the shaft of arbor 10 and outwardly between the discs 11, 11a and through the generally radial discharge ports 49, 51 into the bottom 52 of the groove, flowing in opposite directions across the end face 38 of the diamond set ring 35 and then along the exterior sides 39 of the ring. As a result of the rotation of the device, it centrifugally discharges the liquid through the discharge ports 49, 51 and at the same time creates its own suction in the spaces 29, 22, 26 between the inner portions of the discs 11, 11a and in the clamp members 19, 23 themselves for drawing fluid from a suitable source or reservoir (not shown) through the shaft for subsequent discharge into the work. Thus, the rotating apparatus functions as a pump facilitating the supply of the cooling and flushing fluid or liquid to the groove C.

The coolant being circulated not only maintains the work region clean of cuttings for most effective penetration of the diamond elements 36, 37 into the work, but it keeps the end and side cutting faces 38, 39 of the diamond set ring free of cuttings, preventing the latter from cementing themselves to such faces, that could result in the generation of substantial heat in frictionally sliding along the work which might damage the saw device A, or the work B on which the sawing or cutting action is being conducted. In addition, the circulating fluid passes between the discs 11, 11a and removes heat therefrom, thereby preventing their temperature from building up to an extent that might result in their distortion.

By virtue of the construction disclosed, centrifugal force acting on the matrix 35 and ring 31 is prevented from effecting their separation from the remainder of the apparatus because of the reception of the side tongues 32 in the side grooves 30, aided by the rivets or screws 40 firmly securing the connector ring 31 to the disc members 11, 11a. The head portions 32 of the ring 31, engaging the inner side walls 30a of the opposed circumferential grooves 30, also resist the inward force imposed on the ring as it is urged into the groove C and against the work B.

In the event the diamond set ring 31, 35 becomes worn, the apparatus A can be disassembled from the shaft 10, the screws 40 removed, and another connector and diamond set ring combination assembled in place between the discs 11, 11a, after which the latter is reassembled on the shaft 10 in association with the spacer 12, clamp members 19, 23 and lock nut 27. Thus, the only part requiring replacement is the connector 31 and diamond set ring or rim 35 molded thereto, resulting in substantial economy in view of the lack of necessity for replacing the entire saw blade structure A.

The form of device illustrated in FIG. 4 is essentially the same as the embodiment previously described, except for a different mode of attaching the diamond set ring to the opposed discs. As shown, a dovetail connection is provided between the inner connector ring and the discs. Thus, the opposed inner sides of the disc members 11b, 11c have circumferential grooves 59 therein, defined by radially outwardly converging side walls 60 terminating in substantially axial inner sides 61. The connector ring 31a has a companion shaped portion 62 fitting within these opposed grooves 59, the radial ports 49, 51 extending through the connector member 31a and matrix 35, as in the other form of the invention.

The connector member 31a is inserted between the discs 11b, 11c and the discs suitably forced toward one another so that their tapered sides 60 engage the companion tapered sides on the connector member 31a, at which time the peripheries 34 of the disc members is contiguous the inner end 34a of the matrix ring. Such clamping action tends to draw the connector 31a and diamond set ring 35 radially inwardly because of the coengaging tapered surfaces. The peripheries 34 of the disc members and the circumferential inner end portion 34a of the matrix ring are then brazed to one another to firmly secure the matrix 35 to the disc members. Such attachment is in addition to the clamping action afforded by the clamp members 19, 23, spacer 12 and lock nut 27 in securing the inner portions of the disc members 11b, 11c to the rotatable shaft or arbor 10.

In the form of invention illustrated in FIG. 5, the connector ring 31b is T-shaped in cross-section, with the head portions 32a received under inwardly directed flanges 70 of the opposed discs 11d, 11e. These flanges have their inner axial surfaces 71 tapering toward each other and inwardly of the device for engagement with companion surfaces 72 at the outer ends of the head portions 32a of the connector member. The peripheries 73 of the discs are tapered in a direction toward each other and outwardly of the device and are initially spaced from the inner end 34a of the diamond set ring or matrix 35. Tapered rings 74 are inserted in such spaces, the inner surfaces 75 of the rings being tapered to conform to the peripheral tapers 73 of the disc members, and the peripheries 76 of the ring conforming in shape to the inner end portion 34a of the matrix ring 35.

The diamond set ring 35 and connector ring 31b are placed between the disc members 11d, 11e, with heads 32a of the connector member underlying the disc member flanges 70. The tapered rings 74 are then inserted in the annular spaces between the disc members 11d, 11e and the matrix ring 35 and are forced toward each other, which, because of the tapered surfaces 75, 73 between the rings 74 and the peripheries of the disc members, will urge the matrix 35 and the connector ring 31b in an outward direction. Such urging of the rings in an outward direction will cause the tapered surfaces 72 on the head portions of the connector ring to engage the inner tapered surfaces 71 on the flanges 70 and urge the flanges or end portions of the discs 11d, 11e axially toward each other, thereby firmly clamping all of the parts together. With the inward clamping force maintained on the tapered rings 74, they are suitably brazed to the matrix ring 35 and to the peripheries 73 of the disc members, thereby forming a functionally unitary saw device. Such device may then be assembled on the shaft or arbor illustrated in FIG. 3 and a coolant and flushing fluid pumped therethrough in the same manner as the forms of devices previously described. The centrifugal force tending to shift the ring 31b, 35 outwardly will tend to maintain the discs 11d, 11e inwardly toward each other by virtue of the engagement of the tapered surfaces 72 on the head portions 32a of the connector ring with the tapered surfaces 71 on the flanges 70.

In the form of invention illustrated in FIG. 6, the connector ring 31c between the discs 11f, 11g may be fastened to the latter in substantially the same manner as disclosed in FIG. 3. However, the connector ring 31c is shaped specifically differently than the ring 31 shown in FIG. 3 and coacts with correspondingly shaped grooves in the disc members 11f, 11g to more firmly secure the connector ring to the latter. As shown, the sides 78 of the connector ring heads 32b taper toward each other in an inward direction, and the outer ends 79 of the heads taper toward each other in a radial outward direction. The opposed circumferential grooves in the disc members 11f, 11g are correspondingly tapered, that is, they have inner side walls 80 companion to the inner sides 78 of the heads 32b and outer tapered sides 81 converging toward each other and companion to the tapered sides 79 at the outer ends of the heads.

The connector ring 31c is placed between the disc members 11f, 11g and the disc members are suitably mounted in a clamp device (not shown) and forced toward each other. The coengagement between the outer sides 81 of the disc member grooves and the outer sides 79 of the heads will urge the connector ring 31c in a radial inward direction and will also force the tapered sides 78 of the connector ring against the tapered sides 80 of the disc members, thereby firmly wedging the connector ring 31c to the discs 11f, 11g. Suitable rivets or screws 40 can then be inserted through the disc members and the central portion of the connector ring for the purpose of firmly holding all of the parts together, the tapered surfaces 78, 80 and 79, 81 insuring against any looseness or play between the connector ring 31c and the disc members.

An arrangement similar to that disclosed in FIG. 6 is shown in FIG. 7. In this form of device, the generally T-shaped in cross-section connector ring 31d has a head portion 85 of generally toroidal shape, the opposed grooves 86 of the discs 11h, 11j having a similar shape. This provides outer coengaging surfaces 87 tapering toward each other in an outward direction and inner tapered surfaces 88 converging toward each other in a radial inward direction, much in the same manner as in the form of device illustrated in FIG. 6. The forcing of the disc members 11h, 11j toward each other, with the connector ring 31d therebetween, will cause the outer coengaging surface portions 87 to urge the ring 31d inwardly and force the inner tapered surfaces of the ring firmly snugly against the companion surfaces at the radial inward portions 88 of the disc member grooves. With the clamping force applied to the discs 11h, 11j holding the parts snugly in engagement with one another, suitably screws or rivets 40 can be inserted through the disc members outwardly of the grooves and through the central portion of the connector ring 31d to produce a functionally unitary structure.

In the form of device disclosed in FIG 8, the connector ring 31e has straight parallel sides 90 that fits between disc members 11k, 11m that have inner sides 91 parallel to one another, such sides engaging the connector ring sides 90. With the disc members 11k, 11m held in clamped relation against the connector ring 31e, the sides 90 of the connector ring and the inner sides 91 of the disc members may be brazed together. If desired, suitable screws or rivets 40 may be inserted through the disc members 11k, 11m and connector ring 31e to supplement the brazed attachment of the connector ring to the disc members.

In all of the forms of the invention, the connector ring and diamond set ring are firmly clamped to the disc members to provide a functionally unitary structure. The clamping action is further enhanced by the mode of clamping or attaching the disc members to the rotatable shaft or arbor 10. A strong and sturdy construction, comparatively economical to manufacture, is thereby produced. The effective cutting life of the saw devices is considerably enhanced by the circulation of the coolant and flushing fluid through them, for the purpose of keeping all parts of the structure and the work cool, and thereby preventing them from reaching an inordinately high temperaure that could cause damage, and also effectively maintaining the working region free of cuttings and the cutting elements themselves and surrounding regions of the matrix in a clean condition.

We claim:

1. In abrasive cutting apparatus: a rotatable supporting member; opposed disc members on said supporting member having inwardly opposed circumferentially continuous grooves at their marginal portions; means securing said disc members to said supporting member; and an annular abrasive cutting device between and secured to said disc members, said cutting device comprising a connector ring having oppositely outwardly directed portions in said grooves and a central leg portion projecting between said disc members and beyond the peripheries of said disc members, and a separate continuous rim matrix portion on opposite sides of said leg portion and projecting outwardly of the periphery of said leg portion and molded to said leg portion and overlying and disposed outwardly of the peripheries of said disc members and 2. In abrasive cutting apparatus: a rotatable supporting member; opposed disc members on said supporting member having inwardly opposed circumferentially continuous grooves at their marginal portions; means securing said disc members to said supporting member; and an annular abrasive cutting device between and secured to said disc members, said cutting device comprising a connector ring having oppositely outwardly directed portions in said grooves and a central leg portion projecting between said disc members and beyond the peripheries of said disc members, and a separate continuous abrasive cutting rim on opposite sides of said leg portion and projecting outwardly of the periphery of said leg portion and molded to said leg portion and overlying and disposed outwardly of the peripheries of said disc members; the outer sides of said grooves being tapered; said oppositely directed portions of said connector ring having tapered surfaces companion to and engaging said tapered outer sides of said grooves.

3. In abrasive cutting apparatus: a rotatable supporting member; opposed disc members on said supporting member having inwardly opposed circumferentially continuous grooves at their marginal portions; means securing said disc members to said supporting member; and an annular abrasive cutting device between and secured to said disc members, said cutting device comprising a connector ring having oppositely outwardly directed portions in said grooves and a central leg portion projecting between said disc members and beyond the peripheries of said disc members, and a separate continuous abrasive cutting rim on opposite sides of said leg portion and projecting outwardly of the periphery of said leg portion and molded to said leg portion and overlying and disposed outwardly of the peripheries of said disc members; the outer sides of said grooves being tapered toward each other in a direction toward the axis of said disc members; said oppositely directed portions of said connector ring having tapered surfaces companion to and engaging said tapered outer sides of said grooves.

4. In abrasive cutting apparatus: a rotatable supporting member; opposed disc members on said supporting member having inwardly opposed circumferentially continuous grooves at their marginal portions; means securing said disc members to said supporting member; and an annular abrasive cutting device between and secured to said disc members, said cutting device comprising a connector ring having oppositely outwardly directed portions in said grooves and a central leg portion projecting between said disc members and beyond the peripheries of said disc members, and a separate continuous abrasive cutting rim on opposite sides of said leg portion and projecting outwardly of the periphery of said leg portion and molded to said leg portion and overlying and disposed outwardly of the peripheries of said disc members; the outer sides of said grooves being tapered toward each other in a direction outwardly of the axis of said disc; said oppositely directed portions of said connector ring having tapered surfaces companion to and engaging said tapered outer sides of said grooves.

5. In abrasive cutting apparatus: a rotatable supporting member; opposed disc members on said supporting member having inwardly opposed circumferentially continuous grooves at their marginal portions; means securing said disc members to said supporting member; and an annular abrasive cutting device between and secured to said disc members, said cutting device comprising a connector ring having oppositely outwardly directed portions in said grooves and a central leg portion projecting between said disc members and beyond the peripheries of said disc members, and a separate continuous abrasive cutting rim on opposite sides of said leg portion and projecting outwardly of the periphery of said leg portion and molded to said leg portion and overlying and disposed outwardly of the peripheries of said disc members; the outer sides of said grooves being tapered toward each other in a direction outwardly of the axis of said disc members; the inner sides of said grooves being tapered toward each other in a direction inwardly of the axis of said disc members; said oppositely directed portions of said connector ring having tapered surfaces companion to and engaging said tapered outer and inner sides of said grooves.

6. In abrasive cutting apparatus: a rotatable supporting member; opposed disc members on said supporting member; means securing said disc members to said supporting member; and an annular abrasive cutting device between and secured to the outer margins of said disc members, said cutting device including a continuous rim matrix portion overlying and disposed outwardly of the peripheries of said disc members and extending axially at least to the outer sides of said disc members, and diamond cutting elements embedded in the periphery and sides of said matrix portion; said supporting member having fluid passage means communicating with a space between said disc members; said cutting device having generally radial discharge ports communicating with said space and opening through the periphery of said matrix portion; said matrix portion having circumferentially spaced flushing grooves in its exterior sides extending inwardly from the periphery of said matrix portion.

7. In abrasive cutting apparatus: a rotatable supporting member; a spacer member on said supporting member; opposed discs on opposite sides of said spacer member and spaced thereby axially from one another to provide a circumferentially continuous chamber; clamp members on said supporting member on opposite sides of said discs; stop means on said supporting member engaging one of said clamp members; clamp means on said supporting member engaging said other clamp member for firmly clamping said clamp members against said discs and said discs against said spacer member; an annular abrasive cutting device between and secured to the outer margins of said disc members, said cutting device including a continuous rim matrix portion overlying and disposed outwardly of the peripheries of said disc members and extending axially at least to the outer sides of said disc members, and diamond cutting elements embedded in the periphery and sides of said matrix portion; said supporting member having fluid passage means communicating with the space between said disc members; said cutting device having generally radial discharge ports communicating with said chamber and opening through the periphery of said matrix portion; said matrix portion having circumferentially spaced flushing grooves in its exterior sides extending inwardly from the periphery of said matrix portion.

8. In abrasive cutting apparatus: a rotatable supporting member; a spacer member on said supporting member; opposed discs on opposite sides of said spacer member and spaced thereby axially from one another to provide a circumferentially continuous chamber; clamp members on said supporting member on opposite sides of said discs; stop means on said supporting member engaging one of said clamp members; clamp means on said supporting member engaging said other clamp member for firmly clamping said clamp members against said discs and said discs against said spacer member; and an annular abrasive cutting device between and secured to the outer margins of said disc members, said cutting device including a connector ring disposed between said disc members and a continuous abrasive cutting rim portion molded to said ring and overlying and disposed outwardly of the peripheries of said disc members; said supporting member having fluid passage means communicating with the chamber between said disc members; said cutting device having generally radial discharge ports extending through said ring and rim portion and communicating with said chamber and opening through the periphery of said rim portion; said rim portion having circumferentially spaced flushing grooves in its exterior sides extending inwardly from the periphery of said rim portion.

9. In abrasive cutting apparatus: a rotatable supporting member; a spacer member on said supporting member; opposed discs on opposite sides of said spacer member and spaced thereby axially from one another to provide a circumferentially continuous chamber; clamp members on said supporting member on opposite sides of said discs; stop means on said supporting member engaging one of said clamp members; clamp means on said supporting member engaging said clamp members for firmly clamping said clamp members against said discs and said discs against said spacer member; an annular abrasive cutting device comprising a connector ring between and secured to the outer margins of said disc members and extending outwardly of the periphery of said disc members, said cutting device including a continuous rim matrix portion molded to said ring and overlying and disposed outwardly of the peripheries of said disc members and extending axially at least to the outer sides of said disc members, and diamond cutting elements embedded in the periphery and sides of said matrix portion; said supporting member, clamp members, and discs having fluid passage means communicating with the chamber between said disc members; said cutting device having generally radial discharge ports extending through said ring and rim portion and communicating with said chamber and opening through the periphery of said matrix portion; said matrix portion having circumferentially spaced flushing grooves in its exterior sides extending inwardly from the periphery of said matrix portion.

References Cited by the Examiner

UNITED STATES PATENTS

| | | | |
|---|---|---|---|
| 237,472 | 2/1881 | Blackburn | 125—15 |
| 1,783,727 | 12/1930 | Larsson | 51—206 |
| 2,050,850 | 8/1936 | Krug | 51—206 |
| 2,589,357 | 3/1952 | Fantozzi et al. | 125—15 |
| 3,144,739 | 8/1964 | Brutuan et al. | 51—206.5 |
| 3,176,675 | 4/1965 | Bomba | 21—206 |

FOREIGN PATENTS

| | | |
|---|---|---|
| 20,871 | 9/1910 | Great Britain. |
| 576,794 | 4/1946 | Great Britain. |
| 99,479 | 7/1940 | Sweden. |

HAROLD D. WHITEHEAD, *Primary Examiner.*